United States Patent Office

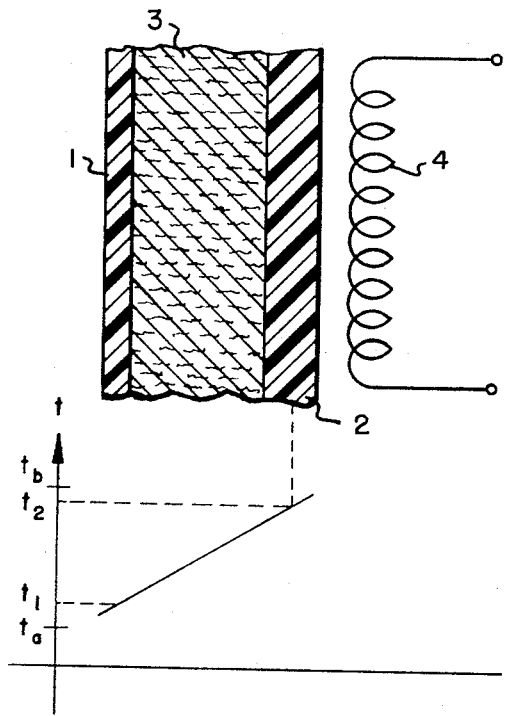
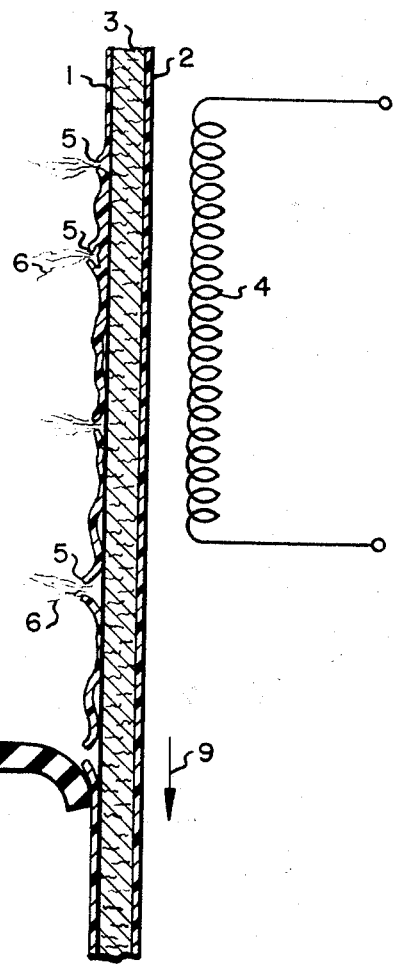
FIG.-1-
FIG.-2-
INVENTORS
TORSTEN L. LINDH
LARS O. I. LINDBLAD

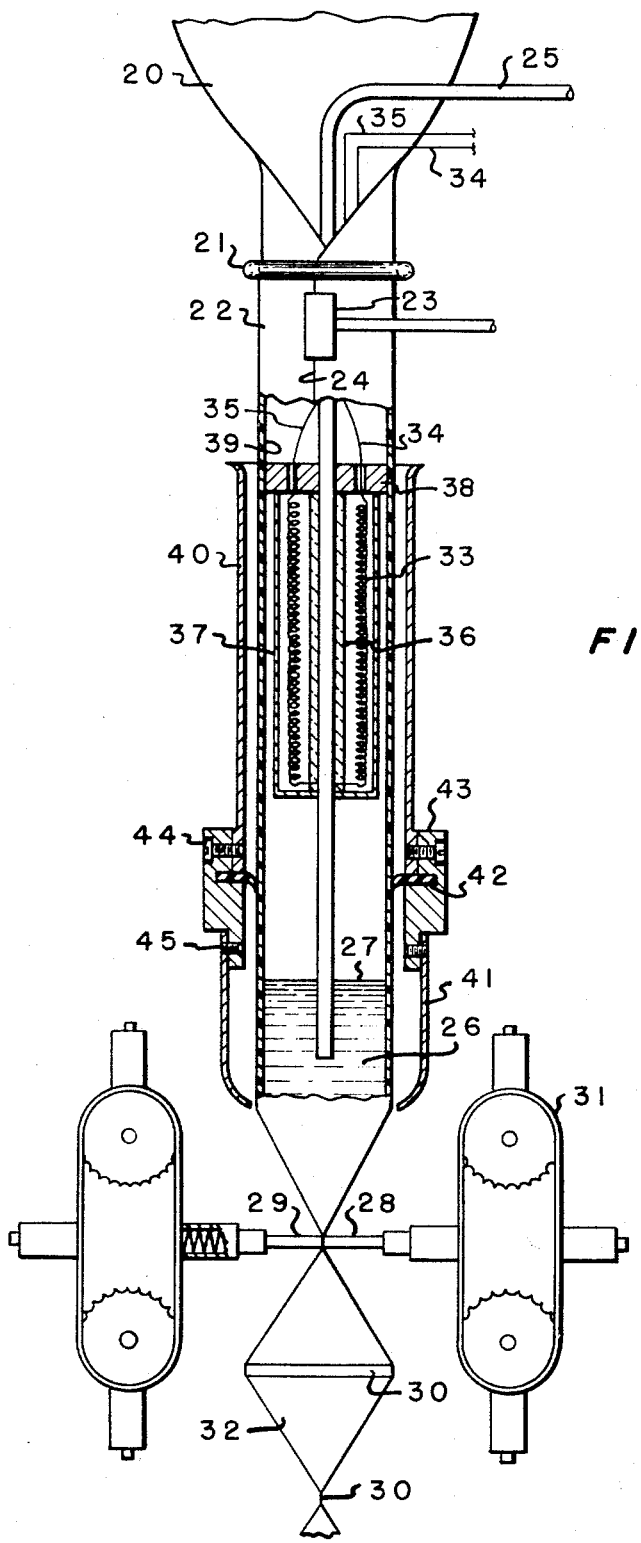

3,445,180
Patented May 20, 1969

3,445,180
METHOD OF ELIMINATING DAMAGE IN HEAT TREATING A PACKAGING MATERIAL
Torsten L. Lindh, Lund, and Lars O. I. Lindblad, Billesholm, Sweden, assignors to AB Tetra Pak, Lund, Sweden, a company of Sweden
Filed Feb. 2, 1966, Ser. No. 524,593
Claims priority, application Switzerland, Feb. 5, 1965, 1,592/65
Int. Cl. A61l *3/00, 1/00;* B32b *31/14*
U.S. Cl. 21—56                                 5 Claims

ABSTRACT OF THE DISCLOSURE

A method and apparatus to eliminate moisture and vapour from a laminated packaging material by applying heat to one side of the material to force the vapor out of the surface of the outer side of the material. The surface through which the vapour has escaped is subsequently smoothed out by a means provided therefor to remove the surface deficiencies caused by the vapour passage.

---

The invention refers to a method of heat treating a packaging material consisting of a laminate of at least three layers including an intermediate layer of a fibrous material, for example paper or cardboard, covered on one side by a first surface layer of a single or multiple ply thermoplastic material, which preferably consists of a mixture of plastic and wax or an equivalent material, and on the other side by a second surface layer of a material impervious to liquids, said second surface layer also consisting of a thermoplastic material, for example plastic, or of a laminate in which a thermoplastic material is included as part thereof.

According to the invention, the packaging material is preferably heat treated for the purpose of destroying any microorganisms at least on the side of the material which is intended to form the inner side of a package. At this heat treatment the liquid present in the fibrous material is vapourized, the vapour tending to force its way out through the surface layers and thereby cause damage to the latter. The invention therefore contemplates a new method of eliminating the deficiencies produced in a new and practical way and of restoring the packaging material so as to present the same good properties as before the heat treatment.

The problem associated with the fact that the liquid which is always found in paper and similar fibrous material is vapourized at a heat treatment and, in the case of the fibrous material being covered on both sides by thermoplastic materials, tends to force its way out through these materials have long been realized. The result of the escape of the vapour is bubbles and crater-like wounds in the material surface which on the one hand are aesthetically unattractive, on the other hand jeopardizes or excludes the tightness of the finished package.

Attempts have previously been made to solve the problem in such a way that first one surface layer has been designed to consist of a thermoplastic material having a relatively high melting point, while the other surface layer has had a considerably lower melting point. Thereby one has succeeded in canalizing the escape of the vapour to the surface layer having the lower melting temperature. To eliminate the deficiencies produced in this surface one has designed the material to consist of a wax or a mixture of wax and plastic which has very low viscosity at the temperatures here concerned. Owing to this low viscosity the deficiences produced will immediately be eliminated, at least to some extent, by the spontaneous coalescence of the material, the desired effect, i.e. the restoration of the material, being apparently achieved.

However, in the case of this method serious secondary effects are obtained which cannot be tolerated where great demands are made upon the quality of the packaging material. Owing to the low viscosity of the amount of material, this is drawn into the fibrous material. If, for example, paper of a type normal in the packaging art is used, the melted material will penetrate into the fibrous material up to the other surface layer of the laminate. Thereby, the properties of the material are completely changed. In addition to one surface layer being reduced in thickness and thereby also in durability, the adhesion between the other surface layer and the fibrous material will be jeopardized. The disadvantages and weaknesses of such a material are obvious.

The problem is solved according to the invention in a new and practical way by manufacturing the two surface layers of such materials and by heating them in such a way that at the heat treatment only one surface layer is melted or made highly soft, yet without being fluid to such extent that it is sucked into the fibrous material, whereby the steam is allowed to penetrate this material and substantially completely produce said bubbles or pits in the surface of the material, while the surface layer on the other side of the fibrous material remains sufficiently rigid to prevent the penetration of steam, and that immediately after the heat treatment, while said first surface layer still is in a melted or at least soft condition, this surface layer is smoothed out by means provided therefor, whereupon the material is cooled, whereby said deficiencies are eliminated and the material as a whole is restored.

By this method one has been able to employ mixtures of wax and plastics having a higher percentage of plastic than has earlier been possible. Since the admixture of plastic may be increased the gas and air tightness is improved. In using the invention it is usually most advantageous to allow the steam to penetrate the side of the material which is intended to form the outside of the finished package. The inside of the package is preferably manufactured from a thermoplastic material having a very good steam barrier, for example pure polyethylene. Other materials can of course also be contemplated. What mixture is provided on the outside of the package is intimately connected with what material is chosen on the inside and has to be decided in each individual case. Among the admixtures of plastic that may be considered should be noted for example polyethylene, polyvinyl acetate and polyethylene copolymer. The waxes preferably consist of paraffin waxes.

The invention will be described in the following with reference to the accompanying diagrammatic drawings, in which:

FIG. 1 illustrates the temperature conditions in a laminate according to one embodiment of the invention, FIG. 2 illustrates the principle of the invention, and FIG. 3 shows how the invention is carried into practice in a special packaging machine.

FIG. 1 shows a laminate which consists of an inner fibrous layer 3 covered on both sides by thermoplastic layers 1 and 2, respectively. The former layer 1 is then intended to form the outside of the finished package and the latter consequently the inside. The side of the material intended to form the inside is subjected to a powerful heating for the purpose of destroying any possible microorganisms on the surface of the material. This may, as the figure, take place by heat radiation from an electrically heated coil 4, or by subjecting the surface to a heated gas or vapour. Other methods are of course also conceivable.

Whichever method of heating is used, a temperature gradient is produced in the material. The highest temperature $t_2$ can be measured in the inside layer 2 and the lowest temperature $t_1$ in the outside layer 1. Between these two layers the temperature decreases continuously. By choosing a material having a melting point $t_b$, or more correctly a melting range, which is so high that it is greater than the maximum measured temperature $t_2$ in the material as the inside layer, this material remains in a solid state. As the outside layer a material is chosen the melting point $t_a$ or melting range of which is lower than the temperature $t_1$ measured in this material. Consequently, this material melts under the influence of the heat treatment.

If for some reason it is desired to sterilize the inside layer 2 by heat treatment from the other side, i.e. against the outside layer 1, this may of course also be carried out according to the invention. Then the temperature curve will be reversed, but provided that the materials are chosen of such a kind that the melting temperature $t_a$ of the outside layer 1 is exceeded, while the melting temperature $t_b$ of the inside layer 2 is not exceeded, also in this case the result will be the same.

By the heat treatment the liquid always contained in the paper material is vapourized. The percentage of water, by weight, in paper generally amounts to at least 5 to 6%. This vapour tends, as has been mentioned, owing to the expansion to penetrate one of the surface layers. Provided that the temperature conditions that have been illustrated in FIG. 1 are prevailing, the vapour will penetrate the layer which is in a melted or at least highly softened condition, i.e. the layer 1. This is diagrammatically illustrated in FIG. 2.

The deficiences caused by the expansion of the steam 6 are designated by 5. They consist of bubbles and craterlike pits in the surface of the material. Owing to the fact that according to the invention a material 1 having high viscosity has been chosen, the deficiences will not coalesce spontaneously but will substantially maintain their form as obtained. Immediately after the heat treatment, while the surface layer 1 is still soft, the deficiencies are smoothed out by a member 7 which engages the material under pressure. The smoothing-out is produced by moving the packaging material and the smoothing-out member in relation to each other, preferably by the packaging material, which is of web form, moving in the direction indicated by the arrow 9, while the member 7 is stationary and rigidly clamped in a holder 8. The smoothing-out member 7 is preferably made from an elastic material, for example rubber or plastic. As a result a sterilized packaging material is obtained which presents the same properties as before the sterilizing procedure.

FIG. 3 shows more closely how the principle of the invention can be applied to a special packaging machine. This machine, which is diagrammatically illustrated in the figure, is of the generally known type which works on packaging materials in web form and which continuously converts the material into a tube, fills the tube with filling material and partitions and detaches the filled tube into individual packages.

The packaging material in web form is designated by the numeral 20 in the figure. This material is rolled off from a roll not shown and is formed by means of a tube forming member 21 into a tube 22. The packaging material is, as mentioned before, covered on the inside with heat sealing plastic. In forming the tube the edges of the material will partly overlap. Pressing together these overlapping edges and supplying heat to this region by a heat sealing member 23 causes a longitudinal joint 24 to be produced. The tube 22 thus formed is filled with a filling material 26 up to a certain level 27. The filling material 26, which is supplied through a piping 25, generally consists of a liquid, but powdery and granular products, for example, may advantageously also be packed by machines of this kind.

In the lower part of the figure it is shown, how the tube 22 is compressed by sealing jaws 28, 29 in narrow zones transverse to the tube axis. By supplying heat to the pair of jaws the insides of the parts of the tube pressed together will stick together so as to form a durable transverse seal after cooling. The pairs of jaws visible in the figure are mounted on endless belts 31 which rotate synchronously with one another and with a further pair of belts disposed at right angles in relation to the former. Since for the understanding of the present invention it will not be required to describe the movements of the sealing members more closely, these will not be explained in detail, but it will only be mentioned that as a result filled and closed packages 32 are obtained which in this case are of tetrahedral shape. By modifying the sealing members the packages may of course also be given other shapes, e.g. parallelepipedic.

In the figure the tube 22 is shown partly in section so as to illustrate the members within the tube. These comprise, in addition to the filling pipe 25, which submerges below the liquid surface 27, the sterilizing means by which the inside of the package is sterilized before coming into contact with the filling material.

The sterilizing means primarily comprises a heater coil 33 which is heated electrically by applying an electric voltage to the input leads 34, 35. The filling pipe 25 is shielded from heating by a heat insulation 36 which is mounted coaxially around this pipe. The heater coil 33 is surrounded by a cylinder 37 which is heated by the coil and emits a uniform heat radiation to the environment. The sterilizing means are defined at the upper part thereof by a packing 38 which engages the tube wall 39 and the filling pipe 25.

The tube 22 is surrounded by a shell the upper part 40 of which extends from the packing 38 past the sterilizing part and slightly below the latter. The lower part 41 of the shell extends down substantially flush with the mouth of the filling pipe. Between these two parts the smoothing-out member 42 is provided. This consists of a rubber or plastic ring which is flat in its free condition. The rubber ring is clamped in a holder 43 which in turn is secured by screws 44, 45 in the upper part 40 and the lower part 41, respectively, of the shell so that these two parts are held together.

In the free condition of the ring 42 it has an inner diameter which is less than the outer diameter of the tube 22. When the tube 22 is passed through the ring 42 a pressure will therefore arise between these two members. As a consequence of this pressure and of the fact that the tube is moved downward through the machine, the ring 42 will occupy the slightly bent-down position shown in the figure, whereby the pressure between the ring and the tube wall will be that fit for smoothening out the side deficiencies.

Although the operation of the device will be clearly seen from FIG. 3 and from the description with reference to FIGS. 1 and 2, it will nevertheless be briefly described.

The packaging material is a laminate of the kind earlier described, and it is desired to get an efficient sterilization of the inside of the packages without thereby deteriorating the properties of the packaging material. The sterilization is produced by heat radiation from the heated coils 33 via the cylinder 37. Thereby all microorganisms on the inside of the tube wall 39 are destroyed. At the same time the liquid contained in the fibrous inner layer of the packaging material is vaporized. The vapour is prevented from penetrating the inside of the tube wall 39 because this side has such a high melting temperature that it is not melted under the influence of the prevailing heat radiation. On the other hand, the outside of the tube wall melts, whereby the vapour is allowed to penetrate this surface layer and flow out into the space between the tube 22 and the shell 40.

Meanwhile the tube is moved, continuously or discontinuously depending on the operation of the machine, downward towards the smoothing-out member, i.e. the ring 42. Because the outside layer of the packaging material has very high viscosity, i.e. is slow-flowing, the deficiences produced by the emerging vapour will substantially retain their initial form when the tube reaches the ring 42. Still, however, the material is sufficiently soft so that the deficiencies can be smoothed out by the ring.

The pressure between the ring 42 and the tube 22 which is obtained as a result of the inner diameter of the ring being less than the outer diameter of the tube will spontaneously distribute itself uniformly around the periphery of the tube. Thereby, a very uniform smoothing-out of the halfmelted or at least soft outer layer is obtained.

After smoothing out the outside of the outer layer, the tube is cooled, which takes place efficiently by the contact with the inner filling material 26. When the tube reaches the sealing jaws 28, 29 the packaging material has thus restored so as to present the same properties as before the sterilization.

It will be understood that the invention can be varied within the scope of the invention. Thus, if for some reason it should be considered advantageous to let the vapour penetrate the side of a packaging material which is intended to form the inside of the finished packages, instead of the outside of the material, this may of course also be realized according to the invention, with proper regard being paid to the choice of material and the temperature distribution.

The invention has proved especially suitable in machines which operate on a tube-shaped package blank with circular cross-section, where the smoothing-out member can be given a shape which is especially adapted to bring about a uniform smoothing-out of the tube around the whole periphery thereof. However, the invention is not limited only to such machines, since with a suitable design of the sterilizing and smoothing-out members the method according to the invention is applicable to a number of different packaging machines.

Further, materials other than three layered ones may be used in practising the invention. Thus, for example, the layer which is intended to form the inside of the package may in turn consist of a laminate of several layers. Then preferably at least the outermost of these layers consists of a thermoplastic material, which however need not necessarily be the case, if the sealing of the package units can be carried out otherwise than by some form of heat sealing. In the method according to the invention the condition is only that the inner layer at the heating remains so tight that it prevents the penetration of vapour. Thus, for example, a laminate including an aluminium foil may be employed according to the invention, the aluminium layer forming part of the package wall between the fibrous layer and the interior of the package.

Further, it is not necessary that the material has the temperatrue and melting point conditions indicated in the example. Thus the penetration of vapour might for example be canalized to the desired surface by means of further heating means provided on this side of the material.

We claim:

1. A method of heat treating a packaging material while eliminating damage thereto, said packaging material consisting of a laminate of at least three layers including an intermediate layer of a fibrous cellulosic material covered on one side by a first surface layer of a single to a multiple ply thermoplastic material and on the other side by a second surface layer of a material impervious to liquids, said second surface layer comprising a thermoplastic material having a melting point higher than that of said first surface layer; said method comprising the consecutive steps of heat treating said packaging material to a temperature above the melting point of said first surface layer, but below the melting point of said second surface layer for the purpose of destroying microorganisms on at least the side of the material intended to form the inner side of a package, said first surface layer being melted without being made liquid to such an extent that it is sucked into the fibrous material; vapourizing any water present in the fibrous material to form steam, said steam being allowed to force its way out only through said first surface layer thereby producing surface deficiencies in the form of bubbles and crater-like pits in said first surface layer, said second surface layer remaining sufficiently rigid to prevent the penetration of said steam through said second surface layer; smoothing out said first surface layer by means provided therefor immediately following said heat treatment and while said first surface layer is still in an at least softened condition; and finally cooling said packaging material, whereby said surface deficiencies are eliminated and the packaging material is restored to its original configuration.

2. The method of claim 1 wherein said packaging material is in the form of a web.

3. The method of claim 2 wherein said web of packaging material is formed into a tube during the heat and restoration treatment thereof, said second surface layer forming the interior surface of the tube.

4. Apparatus to manufacture a sterile package comprising: means to supply a tube of laminated packaging material, said tube of material having a thermoplastic coating on the inside and outside surfaces, said tube of material having at least one layer of fibrous cellulosic material between said thermoplastic coated surfaces; means to heat said inside surface to vapourize moisture in said fibrous cellulosic layer and cause said vapourized moisture to penetrate said outside surface and create crater-like pits therein; means mounting a flexible ring member around said tube, said ring member having an inside diameter less than the outside of said tube thereby pressing uniformly against the outside surface of said tube to smooth out said outside surface; means to fill said tube and means to close said tube into a package after said tube has been filled.

5. The structure of claim 4 wherein the means to heat the inside surface of said tube is located in said tube above said ring member.

References Cited

UNITED STATES PATENTS

| 2,409,628 | 10/1946 | Heritage | 162—184 |
| 2,409,629 | 10/1946 | Heritage | 162—164 |
| 3,164,936 | 1/1965 | Löliger | 21—61 |

MORRIS O. WOLK, *Primary Examiner.*

B. S. RICHMAN, *Assistant Examiner.*

U.S. Cl. X.R.

21—2, 91, 92; 53—180; 156—583; 264—25, 88, 320